United States Patent [19]

Doll

[11] 4,029,539

[45] June 14, 1977

[54] APPARATUS FOR FORMING A STRETCHABLE TUBULAR PACKAGING MATERIAL

[75] Inventor: Brendan L. Doll, Patterson, N.C.

[73] Assignee: Cellu Products Company, Patterson, N.C.

[22] Filed: Sept. 7, 1972

[21] Appl. No.: 286,701

Related U.S. Application Data

[63] Continuation-in-part of Ser. No. 223,246, Feb. 3, 1972, Pat. No. 3,834,969.

[52] U.S. Cl. .............................. 156/513; 156/515; 83/105
[51] Int. Cl.[2] ..................... B32B 31/00; B29D 7/06
[58] Field of Search .......... 156/271, 513, 510, 515, 156/516; 83/102.1, 105

[56] References Cited

UNITED STATES PATENTS

| 2,631,509 | 3/1953 | Whytlaw | 93/94 |
| 2,759,524 | 8/1956 | Davis | 156/271 |
| 2,805,973 | 9/1957 | Klasing et al. | 156/271 |
| 3,040,966 | 6/1962 | Crane | 229/53 |
| 3,140,330 | 7/1964 | Gutierrez | 264/283 |
| 3,486,957 | 12/1969 | Fish et al. | 156/271 |

*Primary Examiner*—Douglas J. Drummond
*Attorney, Agent, or Firm*—Bell, Seltzer, Park & Gibson

[57] ABSTRACT

An apparatus for producing a resilient, readily stretchable tubular member for receiving and packaging articles therein, the apparatus including means for uniting two contiguous layers of flexible foam sheet material by fusibly uniting adjacent side edges of the two layers to form the same into a tubular member. Slitting means is provided for slitting the foam material in a pattern of spaced apart rows of spaced incisions, the rows being so arranged that the tube may be stretched radially to receive therein an article of greater cross sectional area than the initial internal cross sectional area of the tube.

3 Claims, 11 Drawing Figures

APPARATUS FOR FORMING A STRETCHABLE TUBULAR PACKAGING MATERIAL

The present application is a continuation-in-part of application Ser. No. 223,246 filed Feb. 3, 1972 now U.S. Pat. No. 3,834,969.

The present invention relates to an apparatus for producing resilient, stretchable tubular structures which are particularly useful for protectively packaging fragile articles such as tumblers, glassware, bottles or the like.

In copending application Ser. No. 223,246, there is described an apparatus for producing stretchable tubular packaging material from a single elongated sheet of flexible foam material. While such apparatus is adequate for many applications, the production rate is somewhat limited.

It is accordingly an object of the present invention to provide an apparatus capable of efficiently producing stretchable tubular packaging material at a relatively high rate of production.

It is another object of the present invention to provide an apparatus capable of concurrently forming a plurality of elongated tubular members of the described type from sheets of flexible foam material.

It is another object of the present invention to provide an apparatus capable of producing tubular packaging material which is highly resilient, flexible, shock absorbent and radially stretchable so that desired lengths thereof may be stretched radially for receiving therein articles having a greater cross sectional area than the initial cross sectional area of the tubular material. After receiving the article, the tubular material will then recover into substantial conformance to the size and shape of the article contained therewithin.

It is still another object of the present invention to provide an apparatus which is capable of producing the above described packaging material economically so that the material may be discarded after only a single use if so desired.

These and other objects and advantages of the present invention are achieved in the embodiment illustrated herein by the provision of an apparatus comprising means for guiding two advancing layers of flexible foam sheet material into a contiguous overlying relationship, and means positioned downstream of the guiding means for longitudinally severing the two advancing layers along a plurality of parallel lines and uniting the thusly formed adjacent side edges of the two layers to form the same into a plurality of elongated tubular members. The apparatus further comprises slitting means for slitting the sheet material in a pattern of spaced apart rows of spaced incisions, the slitting means including a pair of rolls which also serve to advance the two layers of flexible foam sheet material through the apparatus.

Some of the objects and advantages of the invention having been stated, others will appear as the description proceeds, when taken in connection with the accompanying drawings, in which FIG. 1 is a side elevational view of an apparatus embodying the features of the present invention;

Figure 10:
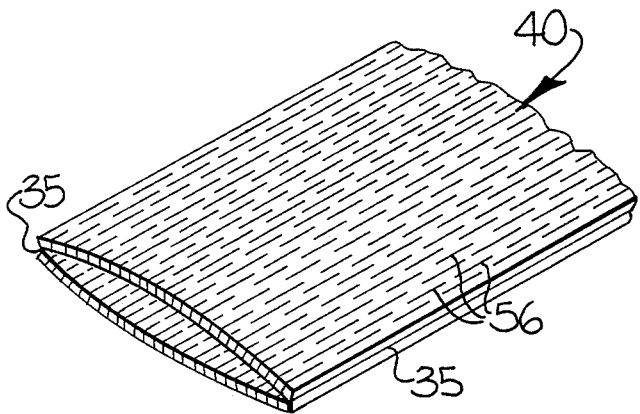
Figure 11:
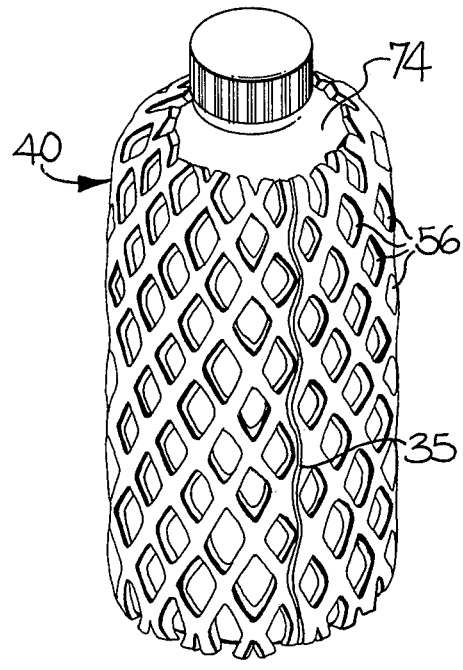

FIG. 10 is a perspective view of a portion of a completely formed stretchable tubular member in relaxed condition as it might appear before inserting an article therein; and FIG. 11 is a perspective view of a length of the tubular material showing the same in a stretched condition firmly encircling an article therein and illustrating how the previously formed incisions in the wall of the tubular member take on a lozenge-like configuration when the tubular member is radially stretched.

Referring more specifically to the drawings, the illustrated apparatus comprises a first supply source 20 and a second supply source 21 from which the sheets 22 and 23, respectively, are withdrawn. The supply sources are conventional, and typically comprise wound rolls of the sheets.

Each of the sheets 22 and 23 comprises a resilient flexible or pliable foam material of such thickness as to provide the desired protection for the particular articles to be packaged therein. For example, the sheets may be in the range of about 1/16 to ½ inch in thickness, depending upon the size and weight of the articles to be received in the tubular member formed therefrom. It is preferred that the sheets have a thickness of about ⅛ to ¼ inch, and typically the sheets are formed of thermoplastic polyethylene foam material, although other suitable foam materials, such as polypropylene foam, flexible foam polystyrene, or natural or synthetic foam rubber may be used.

The use of thermoplastic polyethylene foam material is desirable since it is less expensive than other known foam materials suitable for packaging articles therein, and it is more readily machine processed than other resilient flexible foam materials. In particular, polyethylene foam sheets are readily suceptible to being severed and fusibly united by heat sealing means as hereinafter further described.

Figure 1:
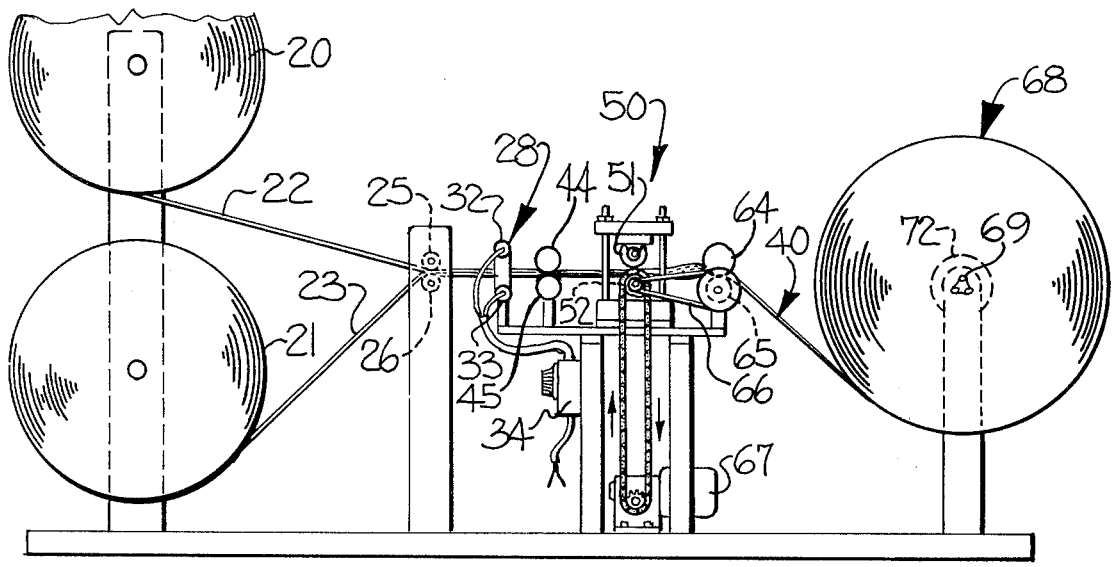
Figure 2:
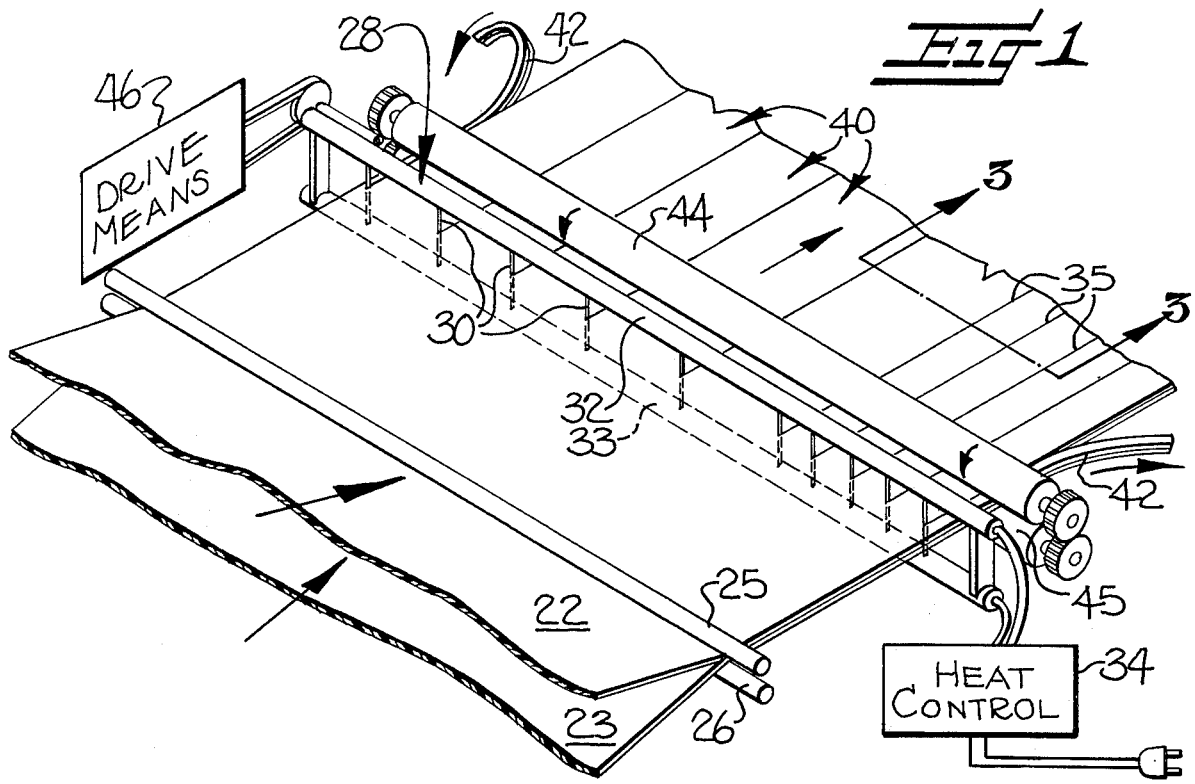
FIG. 2 is a fragmentary perspective view of the tube forming portion of the apparatus.
Figure 3:
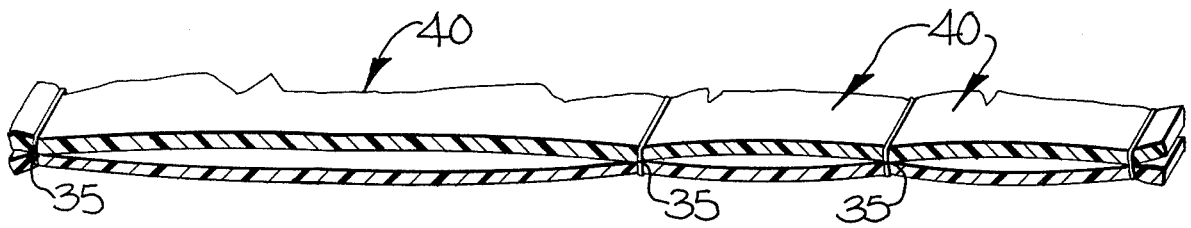
FIG. 3 is a fragmentary vertical sectional view taken substantially along the line 3—3 in FIG. 2.

Upon leaving their supply sources, the two advancing sheets 22 and 23 are guided into a contiguous overlying relationship by the rolls 25 and 26 which are positioned on opposite sides of the sheets in the manner shown in FIGS. 1 and 2 such that the sheet 22 forms a top layer and sheet 23 forms a bottom layer.

The two overlying layers then pass through means generally indicated at 28 for severing the two layers along a plurality of parallel lines and simultaneously fusibly uniting the thusly formed adjacent side edges of the two layers along each of the parallel lines to form the same into a plurality of separated elongated tubular members. More particularly, the severing and uniting means 28 comprises a series of laterally spaced, vertically directed and electrically operable heating elements 30 carried between the fixed support rods 32 and 33. As seen in FIG. 2, the lateral spacing between some pairs of the elements 30 is unequal to the lateral spacing between other adjacent pairs to form tubular members of different diameters. Also, the lateral spacing may be adjusted by suitable adjustment means (not shown) on the rods 32 and 33 so that the diameter of the resulting tubes may be controlled in the manner to become apparent. The temperature of the heating elements 30 may be controlled by a suitable electrical control 34, the elements 30 being of relatively thin lateral dimension and designed to longitudinally sever the advancing sheets and to simultaneously melt the thusly formed adjacent side edges to a viscous or sticky condition so that the opposing edges of the two layers will be quickly and effectively bonded together to form a seam 35 (FIG. 10) upon leaving the vicinity of the elements 30. In this regard, it has been found that while the adjacent side edges of the top and bottom layers will join together along the seams 35 upon leaving the elements 30 in the manner described above, the adjacent side edges formed in the same sheets remain somewhat spaced apart in the lateral direction upon leaving the heating elements 30 and thus do not rejoin after being severed. Thus the severing and heating means serves to transform the two advancing overlying layers of foam sheet material into a plurality of advancing elongated flattened tubular members generally indicated at 40. It will also be observed that the two outermost heating elements 30 serve to define one edge of the outermost tubular members 40, with a small waste portion 42 being discarded.

The advancing tubular members 40 next pass between a pair of mating drive rolls 44 and 45 which are rotatably driven by a suitable drive means 46 and which serve to facilitate the advance of the sheets along the indicated path of travel. Next, the advancing tubular members 40 pass through the slitting means generally indicated at 50, and which comprises a pair of rolls 51 and 52 forming a nip adapted to receive the advancing tubular members therebetween. The roll 52 includes a plurality of axially spaced substantially annular rows of spaced cutting blades 54 projecting radially therefrom, with the blades of adjacent annular rows being staggered.

Roll 51 is in the form of a smooth, hard-face roll and serves as a pressure or anvil roll to press the advancing tubular members against the cutting blades 54. By this arrangement, the blades 54 penetrate the tubular members and form incisions 56 through both halves thereof. The length and spacing of the blades 54 of roll 52, and of the resulting incisions 56, may vary depending upon the cross sectional area of the tube being formed and its desired stretchability. Typically, the individual blades 54 may be in the range of ¼ to 2 inches long and may be spaced apart both axially and annularly a distance in the range of about 1/16 to ½ inch or more.

Figure 8:
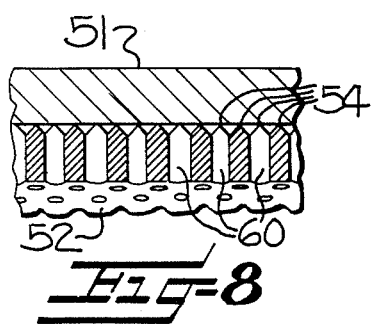
FIG. 8 is a fragmentary vertical sectional view taken substantially along the line 8—8 in FIG. 6.

The blades 54 of the roll 52 may be economically formed by initially forming or cutting a spiral thread on a conventional lathe. Each annular thread portion is substantially of inverted V-shaped in cross section, and adjacent annular or convolute ridge portions of the thread define an annular substantially V-shaped groove therebetween as shown in FIG. 8. After the thread is formed, a plurality of substantially equally spaced voids or recesses are formed along the ridge of the spiral thread. Conveniently, such recesses may be formed by drilling radial holes 60 through the annular wall of the roll 52 at the desired spaced intervals along the projecting spiral ridge of the threads to thereby define the blades 54. Thus whenever the blades 54 become dull, they may be easily sharpened simply by mounting the roll on a lathe and again machining or grinding the threaded portion thereof.

Figure 4:
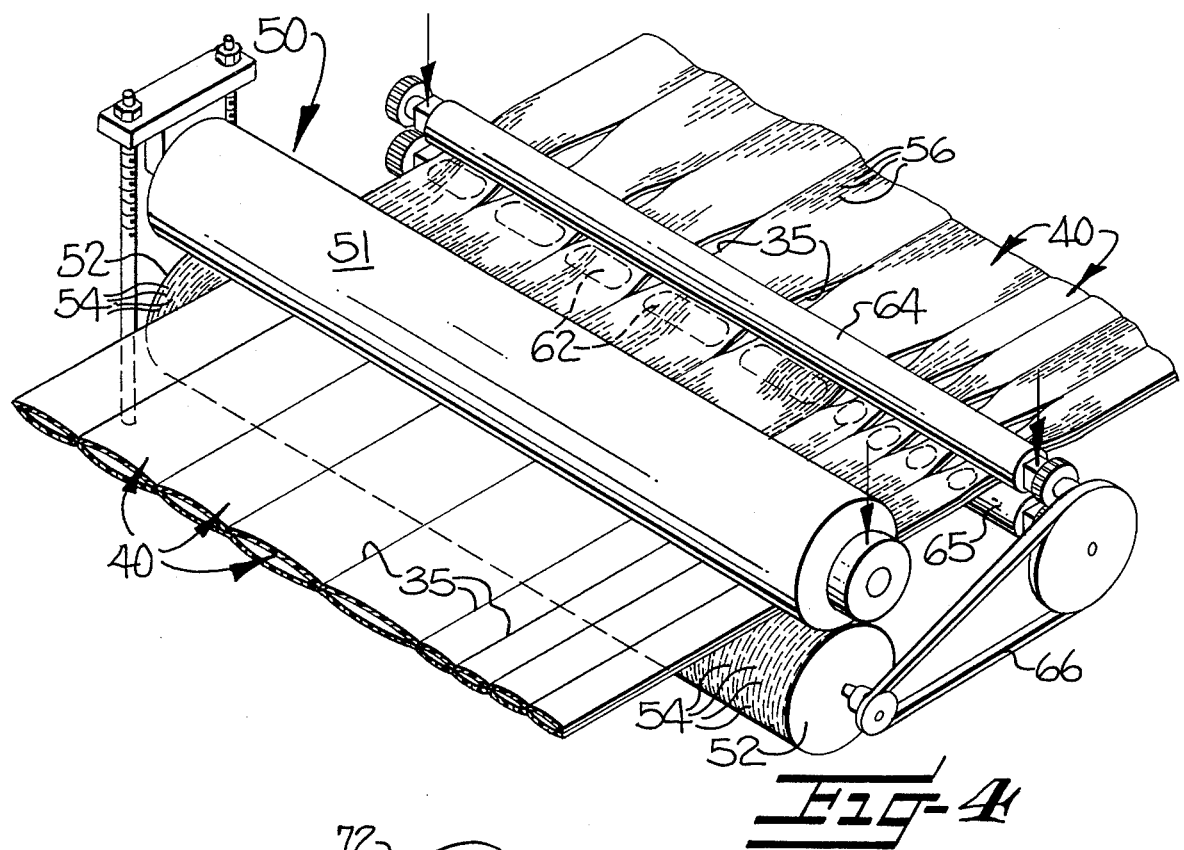
FIG. 4 is a fragmentary perspective view of the slitting means and tube spreading means of the apparatus.
Figure 5:
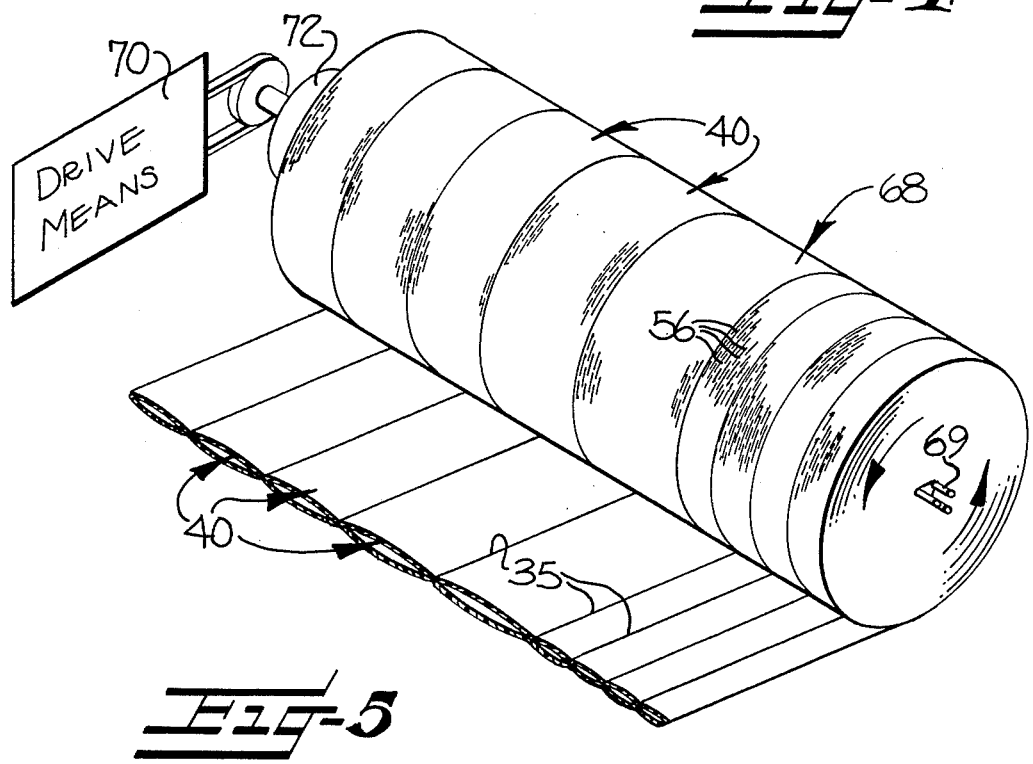
FIG. 5 is a fragmentary perspective view of the take-up means of the apparatus.
Figure 6:
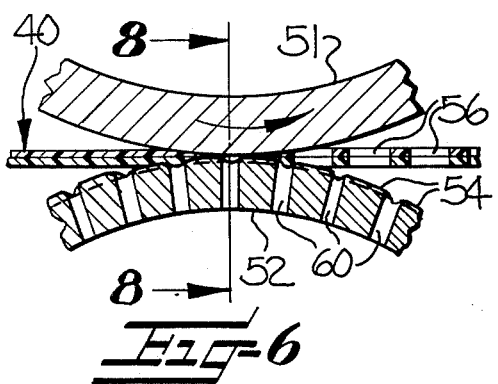
FIG. 6 is an enlarged fragmentary sectional view of proximal portions of the slitting roll and adjacent anvil roll shown in FIG. 4.
Figure 7:
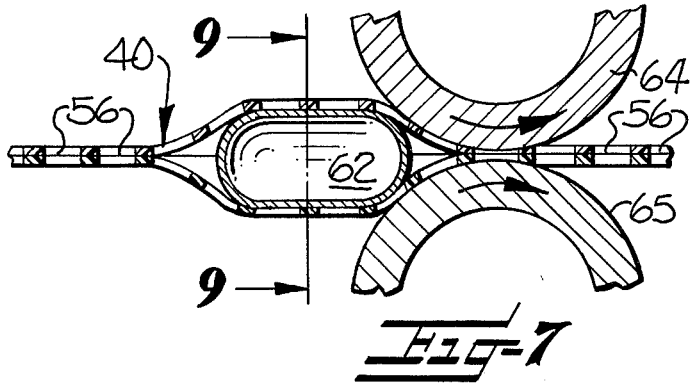
FIG. 7 is an enlarged fragmentary sectional view of the spreading means shown in FIG. 4.
Figure 9:
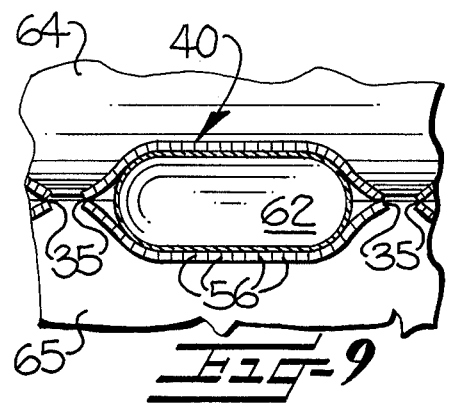
FIG. 9 is a fragmentary vertical sectional view taken substantially along the line 9—9 in FIG. 7.

The cutting blade 54 may cause at least some of the material in the lower half of the flattened tubular members 40 to be pressed into the incisions being formed simultaneously in the upper half thereof. This tends to cause the two halves of the tube to be connected together. In order to break any such mating relationship between the two halves of the tubular members, a tube opening or spreading member 62 is provided for each tubular member which may take the form of an oval or spherical member (note FIGS. 7 and 9) of lesser cross sectional area than the initial internal cross sectional area of the tubular member. Each spreading member is positioned within the associated tubular member downstream of the slitting means 50 in the manner shown in FIG. 4. Also, in order to prevent the spreading member 62 from moving longitudinally with the tubular member, there is provided a pair of press rolls 64 and 65 mounted downstream of the slitting means 50. The press rolls not only restrain the spreading members from longitudinal movement with the tubular members, but also serve to compress the tubular members to again flatten the same so that the opposing halves thereof are disposed in a compact superposed contacting relationship to thereby facilitate subsequent storage and handling. The press rolls 64 and 65 are operatively connected to the slitting means 50 by means of belt 66, and both the press rolls and slitting means are driven by a suitable drive motor 67 (FIG. 1). Thus both the press rolls and slitting means also serve to advance the two overlying layers of sheet material longitudinally through the apparatus.

The apparatus of the present invention may further include a take-up device 68 generally illustrated in FIG. 1 and which is positioned downstream of the press rollers 64 and 65. Generally, the take-up device comprises a spindle 69 rotatably driven by a suitable drive means 70. Also, an intermediate slip clutch 72 may be provided such that the spindle may maintain the tubular members under a desired tension as they are being wound thereabout. By this arrangement, all of the tubular members formed by the apparatus of the present invention are formed into rolls about a common axis defined by the spindle 69.

When an article, such as the bottle 74 as seen in FIG. 11, is desired to be packaged, a suitable length of one of tubular members 40 is severed from the roll formed by the take-up device. This length is radially stretched and the bottle 74 inserted therein. Upon radial stretching, the foam material is opened into a net-like form with the incisions 56 forming lozenge-shaped openings. When the radial opening force is removed, the tubular member recovers into substantial comformance with the size and shape of the bottle to closely overlie and protect the same during subsequent shipment and handling.

In the illustrated embodiment, the incisions 56 are formed in the flexible foam sheet material following formation of the same into the tubular members 40. However, it is to be understood that the incisions could be formed in the sheets before the tubular members are formed therefrom simply by positioning the slitting means 50 upstream of the severing and uniting means 28.

In the drawings and specification, there has been set forth a preferred embodiment of the invention, and although specific terms are employed, they are used in a generic and descriptive sense only and not for purposes of limitation.

That which is claimed is:

1. An apparatus for producing a stretchable tubular packaging material from elongate foam sheet material and which is adapted to receive and package articles therein, said apparatus comprising means for guiding two advancing sheets of flexible foam sheet material into a contiguous overlying relationship to form overlying layers of the sheet material, means positioned downstream of said guiding means for longitudinally severing the two advancing overlying layers of sheet material along a plurality of parallel lines and fusibly uniting the thusly formed adjacent side edges of the two layers along each of the parallel lines to form the same into a plurality of elongated flattened tubular members, said severing and uniting means comprising a plurality of laterally spaced, relatively thin electrically operable heating elements generally perpendicular to the direction of advance of the overlying layers and positioned to extend entirely through the advancing layers, slitting means for slitting the two advancing overlying layers of the sheet material in a pattern of spaced apart rows of spaced incisions with the incisions of adjacent rows being staggered, said slitting means including a pair of rolls forming a nip therebetween through which said overlying layers pass, one of said rolls having a plurality of axially spaced substantially annular rows of spaced cutting blades projecting radially therefrom, the blades in adjacent annular rows being staggered to form said incisions through the two layers of foam material, spreading means positioned downstream of said slitting means and engaging the interior of each tubular member for spreading opposing halves thereof to insure that they may be thereafter readily separated, and means for advancing the two layers of flexible foam sheet material through said guiding means, and severing and uniting means, and said slitting means.

2. The apparatus as defined in claim 1 further comprising means positioned downstream of said spreading means for again flattening the tubular members.

3. The apparatus as defined in claim 2 further comprising take-up means positioned downstream of said flattening means for forming the tubular members into rolls about a common axis.

* * * * *

UNITED STATES PATENT AND TRADEMARK OFFICE
CERTIFICATE OF CORRECTION

PATENT NO. : 4,029,539
DATED : June 14, 1977
INVENTOR(S) : Brendan L. Doll

It is certified that error appears in the above-identified patent and that said Letters Patent are hereby corrected as shown below:

Column 5, line 21, after "elements" insert --extending--.

Signed and Sealed this

Twentieth Day of September 1977

[SEAL]

Attest:

RUTH C. MASON
Attesting Officer

LUTRELLE F. PARKER
Acting Commissioner of Patents and Trademarks